United States Patent [19]

Boothroyd et al.

[11] Patent Number: 4,611,278
[45] Date of Patent: Sep. 9, 1986

[54] WRAPAROUND BUFFER FOR REPETITIVE DECIMAL NUMERIC OPERATIONS

[75] Inventors: Donald C. Boothroyd, Phoenix; John E. Wilhite; Robert W. Norman, Jr., both of Glendale, all of Ariz.

[73] Assignee: Honeywell Information Systems Inc., Phoenix, Ariz.

[21] Appl. No.: 481,228

[22] Filed: Apr. 1, 1983

[51] Int. Cl.[4] .............................................. G06F 9/34
[52] U.S. Cl. ................................................... 364/200
[58] Field of Search ... 364/200 MS File, 900 MS File

[56] References Cited

U.S. PATENT DOCUMENTS 4,414,622  11/1983  Matsumoto ..................... 364/200
4,467,444   8/1984  Harmon, Jr. et al. ............ 364/200

Primary Examiner—Thomas M. Heckler
Attorney, Agent, or Firm—A. A. Sapelli; J. S. Solakian; A. Medved

[57] ABSTRACT

The present invention relates to the operational control of a digital computer system which includes the digital logic circuitry for temporarily storing results internal to an execution unit. An input unit of the execution, which inputs operand words to the execution logic of the execution unit, includes a first stack for holding operand words received from an external memory unit and a second stack for holding the result words of the execution logic. The input unit also includes a switch element for selecting words stored in the first and second stack which are to be utilized as input operand words to the execution logic in response to at least one control signal.

2 Claims, 17 Drawing Figures

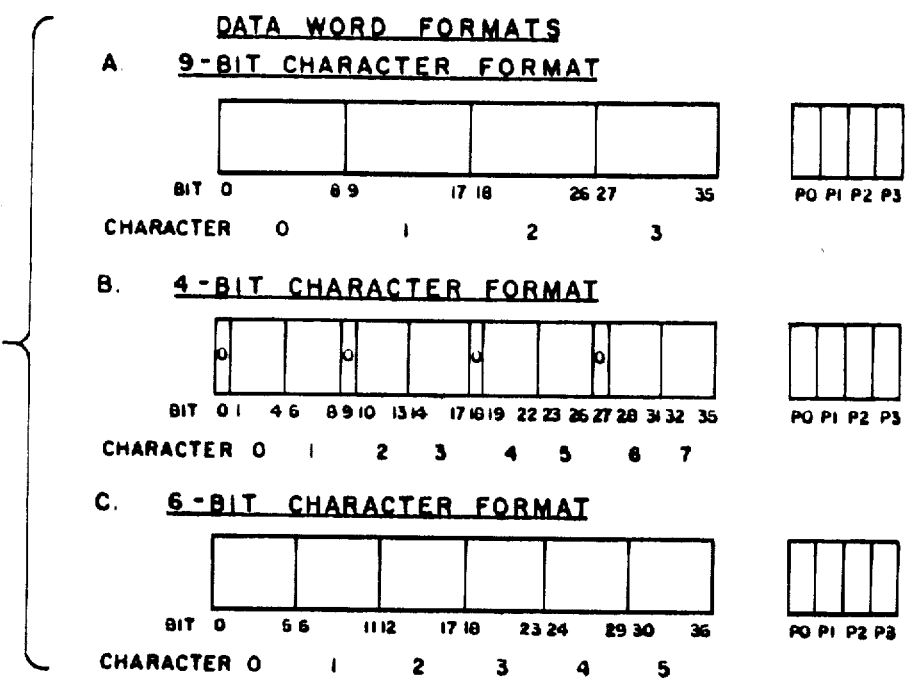
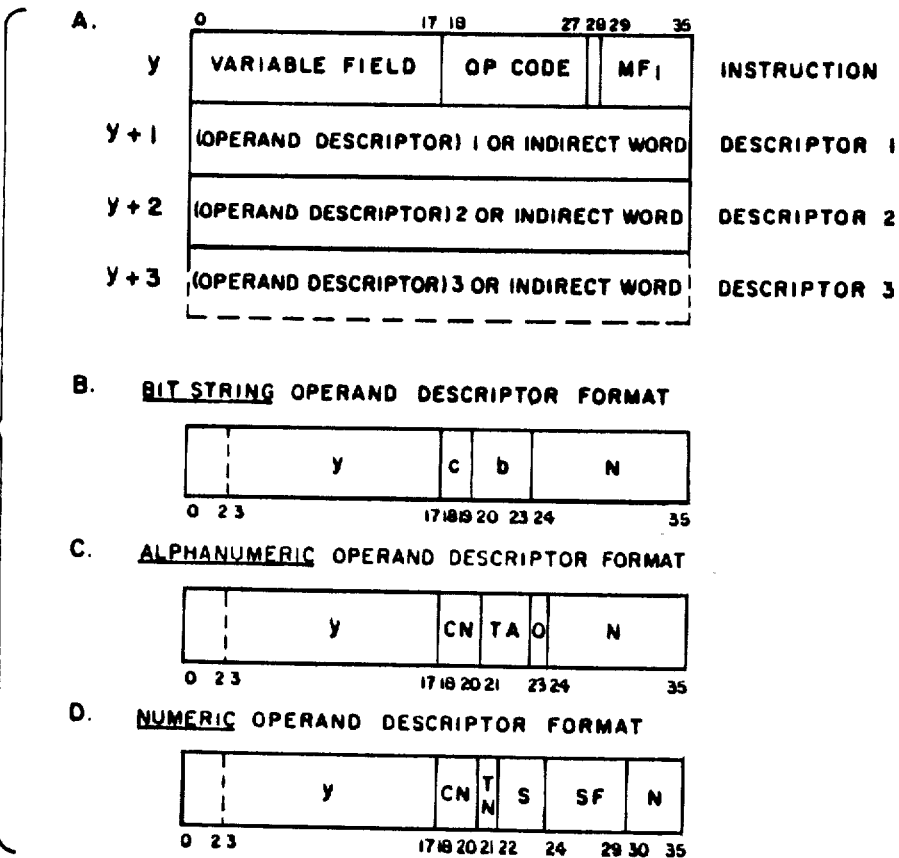

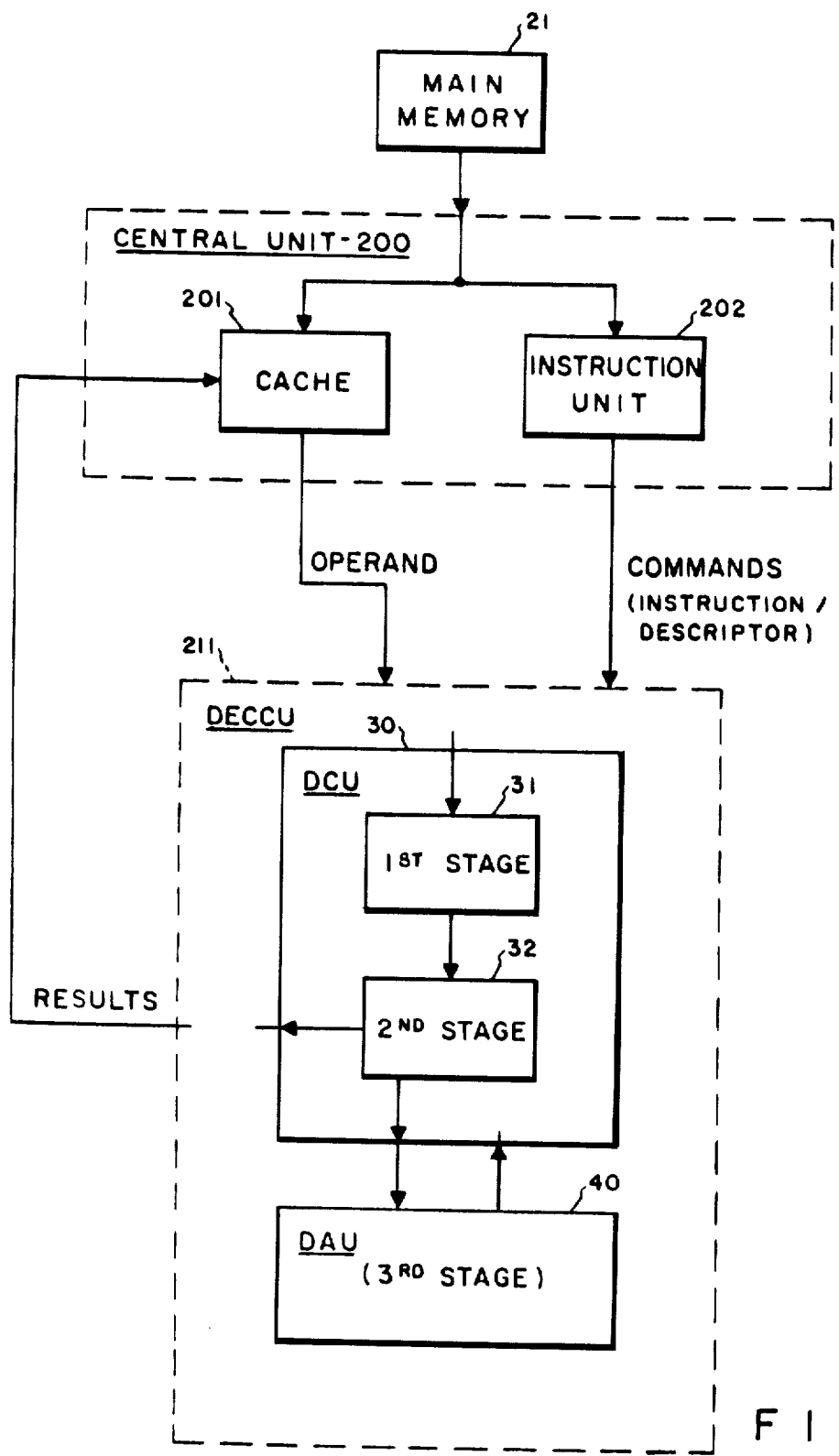
F I G. 5

FIG. 8

| | 0 1 | 8 9 | 14 | 18 19 20 21 22 23 24 | 26 27 | 35 |
|---|---|---|---|---|---|---|
| I | EXECUTION CODE | SF₁ | | | SEQ# | FILL |
| D1 | DCW₁ | BP₁ | W₁ | SF₂ | TYP₁ SN₁ Z₁ G₁ | L₁-1 |
| D2 | DCW₂ | BP₂ | W₂ | SF₃ | TYP₂ SN₂ Z₂ G₂ | L₂-1 |
| D3 | DCW₃ | | | | TYP₃ SN₃ Z₃ G₃ | L₃-1 |

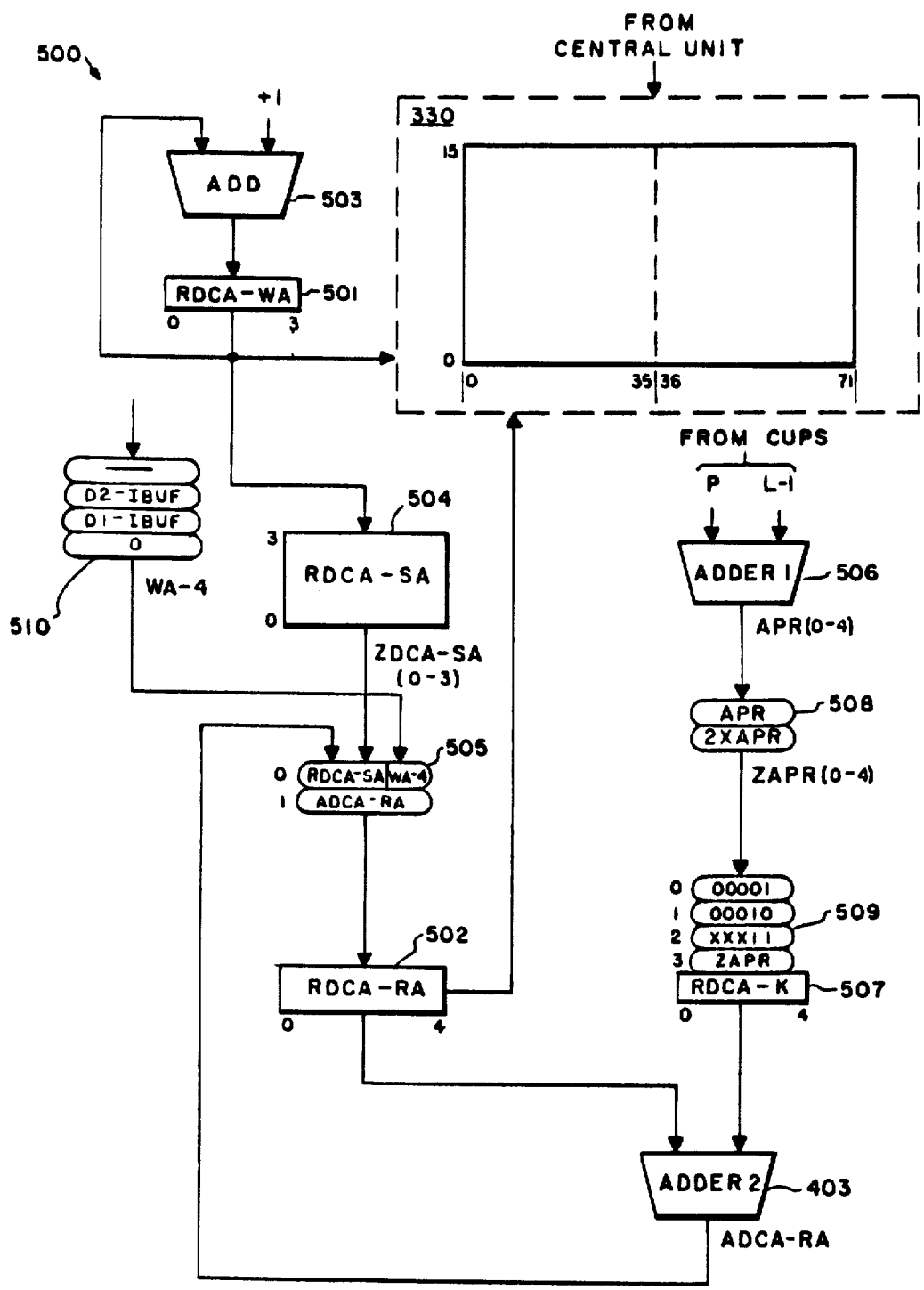
F I G. 9

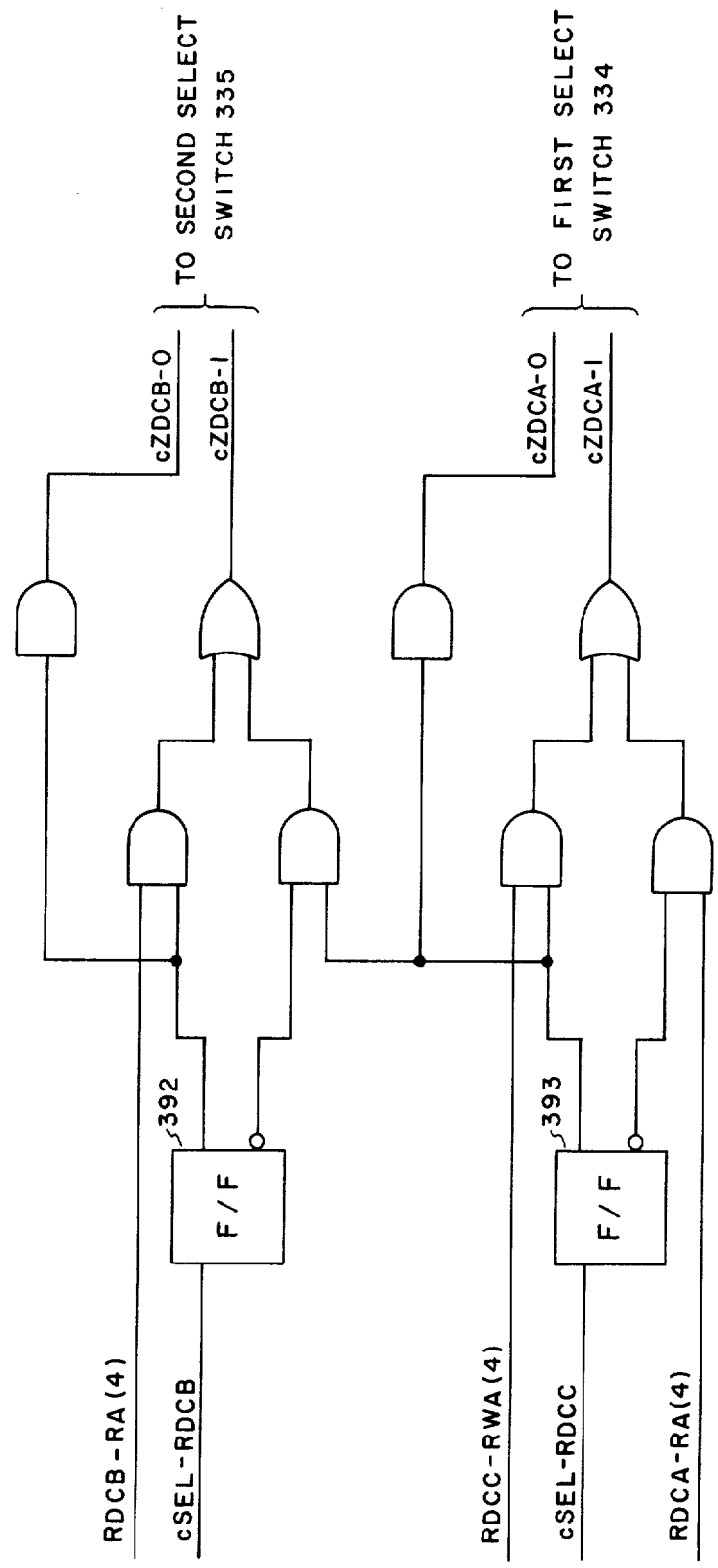
F I G. 17

WRAPAROUND BUFFER FOR REPETITIVE DECIMAL NUMERIC OPERATIONS

RELATED PATENT APPLICATIONS

The present patent application is related to the following U.S. patent applications and U.S. Patent, which are assigned to Honeywell Information Systems Inc., the assignee of the present application, all of the references listed below being incorporated by reference herein, to the extent necessary for an understanding of the present invention.

1. Apparatus for Aligning and Packing a First Operand Into a Second Operand of a Different Character Size, by Donald C. Boothroyd et al, Ser. No. 394,952, filed on 2 July 1982, now U.S. Pat. No. 4,583,199;
2. Data Alignment Circuit, by Donald C. Boothroyd et al, Ser. No. 394,951 filed on 2 July 1982, now U.S. Pat. No. 4,506,345;
3. Collector, by R. Guenthner, G. Edington, L. Trubisky, and J. Circello, Ser. No. 434,129, filed 13 Oct. 1982, now U.S. Pat. No. 4,594,660;
4. A Pipelined Decimal Character Execution Unit, by Donald C. Boothroyd et al, Ser. No. 481,224, filed on even date herewith;
5. Apparatus for Detecting a Predetermined Character of a Data String, By Donald C. Boothroyd et al, Ser. No. 481,226, filed on even data herewith, now U.S. Pat. No. 4,575,795;
6. U.S. Pat. No. 4,268,909, entitled "Numeric Data Fetch-Alignment of Data Including Scale Factor Difference", by Kindell et al.
7. Apparatus for Forward or Reverse Reading of Multiple Variable Length Operands, by Donald C. Boothroyd et al, Ser. No. 481,225, filed on even data herewith;
8. Data Available Indicator for an Exhausted Operand String, by Donald C. Boothroyd et al, Ser. No. 481,227, filed on even date herewith;
9. Method for Decreasing Execution Time of Numeric Instructions, by Donald C. Boothroyd et al, Ser. No. 481,202, filed on even date herewith.

BACKGROUND OF THE INVENTION

This invention relates to the operational control of a digital computer system, and more particularly, to the digital logic circuitry for temporary storing results internal to an execution unit wherein the intermediate results are to be utilized as operand data in the execution of the next instruction.

An objective, which almost always faces designers furthering the advancement of digital computers, is to decrease the time required for executing each of the instructions executed by the digital computer, thereby decreasing the overall time required by the digital computer to perform a predefined task and increasing the efficiency of the digital computer. Many schemes have been devised by digital computer designers in an attempt to meet this objective. In the execution of many instructions, the reading of stored operand data from a memory storage device must be performed. The time for reading the stored operand data may vary greatly depending on the architecture of the data processing system. In order to assist in speeding-up the fetch time, i.e., the time required to read the operand data from the memory device, recent data processing systems have incorporated the use of a cache memory. In spite of the utilization of a cache, a delay occurs when the results of a first instruction are to be used as an operand of a second instruction immediately following the first instruction. The delay, sometimes referred to as the store-load break, is caused by having to write the results to a cache (or memory) and then read the results back again into the execution unit.

Therefore, there is provided by the logic circuit of the present invention an apparatus for holding the results of an instruction execution for use in the execution of the next instruction. The apparatus of the present invention also functions as an auxiliary input stack thereby eliminating the time delay caused by requiring a (cache) memory read operation.

SUMMARY OF THE INVENTION

Therefore, there is provided by the present invention an apparatus for holding results which can subsequently be utilized as input operand data. An input unit of an execution unit inputs operand words to execution logic of the execution unit wherein the operand words include operand words stored external to the execution unit or result words of the execution logic. The input unit comprises a first storage element, having an input terminal adapted to receive the operand words stored external to the execution unit, for holding the operand words. A second storage element, operatively connected to an output of the execution logic, holds the result words. A switch element, operatively connected to the first storage element and to the second storage element, and further operatively connected to the execution logic, selects the operand words of the first storage element and the result words of the second storage element to input the words to the execution logic in response to at least one control signal.

Accordingly, it is an object of the present invention to provide an apparatus for holding results of an executed instruction.

It is still another object of the present invention to provide an apparatus for holding results of an executed instruction internal to the execution unit.

It is still another object of the present invention to provide an apparatus for holding results of an executed instruction internal to the execution unit thereby eliminating a memory access.

It is a further object of the present invention to provide an apparatus for holding results of an executed instruction internal to the execution unit when the result is to be used as operand data for the next instruction.

It is still a further object of the present invention to provide an apparatus for holding results of an executed instruction internal to the execution unit wherein said apparatus can function as an auxiliary input stack within the execution unit.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 3 shows a plurality of data word formats of the central processing unit;

FIG. 4 shows the instruction word and descriptor word formats of the computer word of the central processing unit having a system configuration utilizing a plurality of execution units, including a decimal character unit;

FIG. 5 shows a functional block diagram of the decimal character unit;

FIG. 8 shows a format of the decimal character unit instruction and descriptor words;

FIG. 9 shows a logic block diagram of the control logic for reading operand data of an input stack in a forward/reverse direction;

FIG. 17 shows a logic circuit diagram of the select control logic.

DETAILED DESCRIPTION

Figure 1:
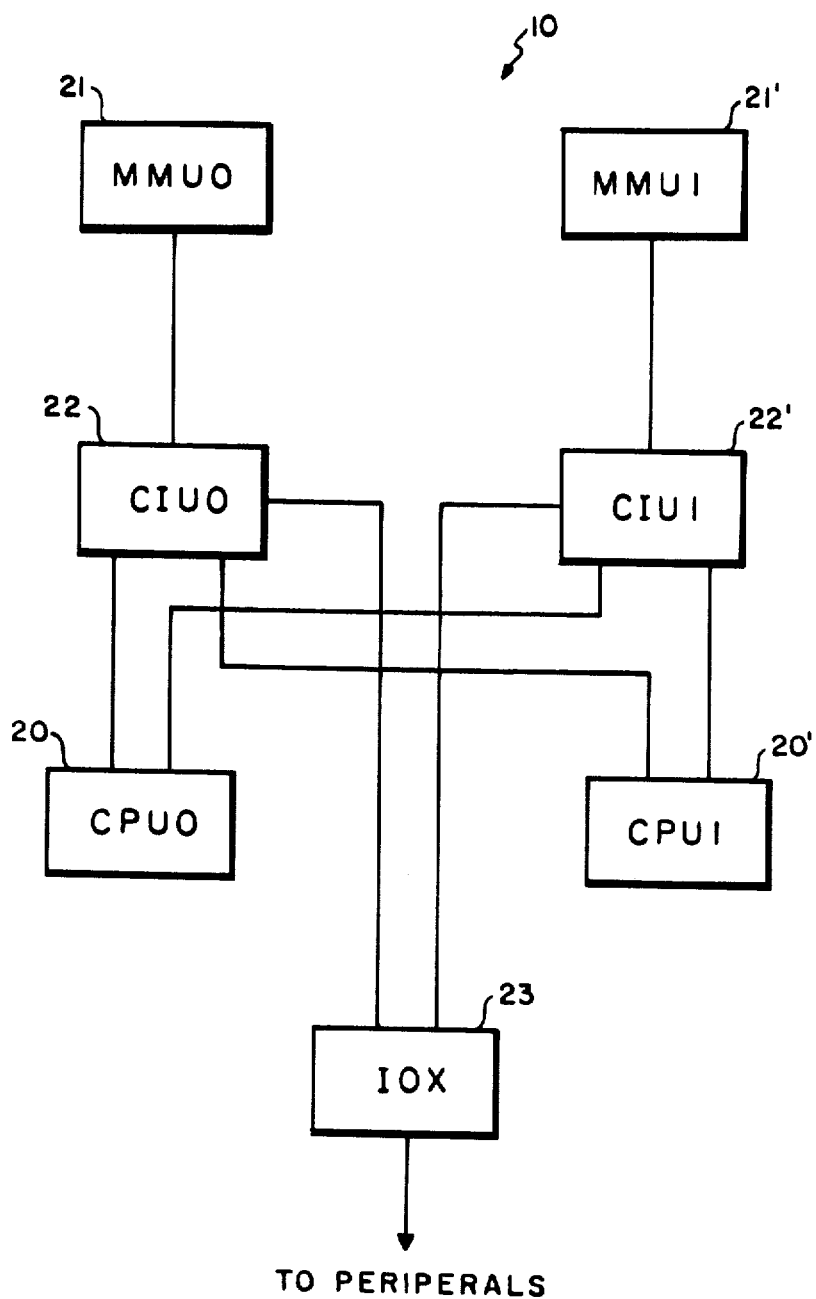
FIG. 1 shows a block diagram of a data processing system having a plurality of modules, including a central processing unit.

The present invention finds particular application in a decimal character execution unit for executing a predetermined class of instructions, namely decimal arithmetic and character operations. Before describing the present invention, it will be helpful to understand its operating environment, which will now be described. Referring to FIG. 1, a central processing unit (CPU) is shown as a module of a data processing system (DPS) 10. A first central processing unit (CPU 0) 20 and a second central processing unit (CPU 1) 20' comprise the CPU modules of DPS 10, each having full program execution capability and performing the actual information processing of the data processing system 10. CPU 0 20 and CPU 1 20' are each operatively connected to a first main memory unit (MMU0) 21 and a second main memory unit (MMU1) 21', through a first central interface unit (CIU 0) 22 and a second central interface unit (CIU 1) 22', respectively. MMU 0 and MMU 1 store programs and data utilized by CPU 0 and CPU 1. CIU 0 and CIU 1 act as the memory managers for the respective memories. CIU 0 and CIU 1 are each connected to an input/output multiplexer (IOX) 23 which provides an interface between the MMU and the various system peripherals. All CPU communication and interaction with other system modules is via the CIU. The DPS 10 of FIG. 1 shows a two CPU/two CIU configuration. It will be understood by those skilled in the art that various configurations are possible, including a single CIU/CPU configuration.

Figure 2:
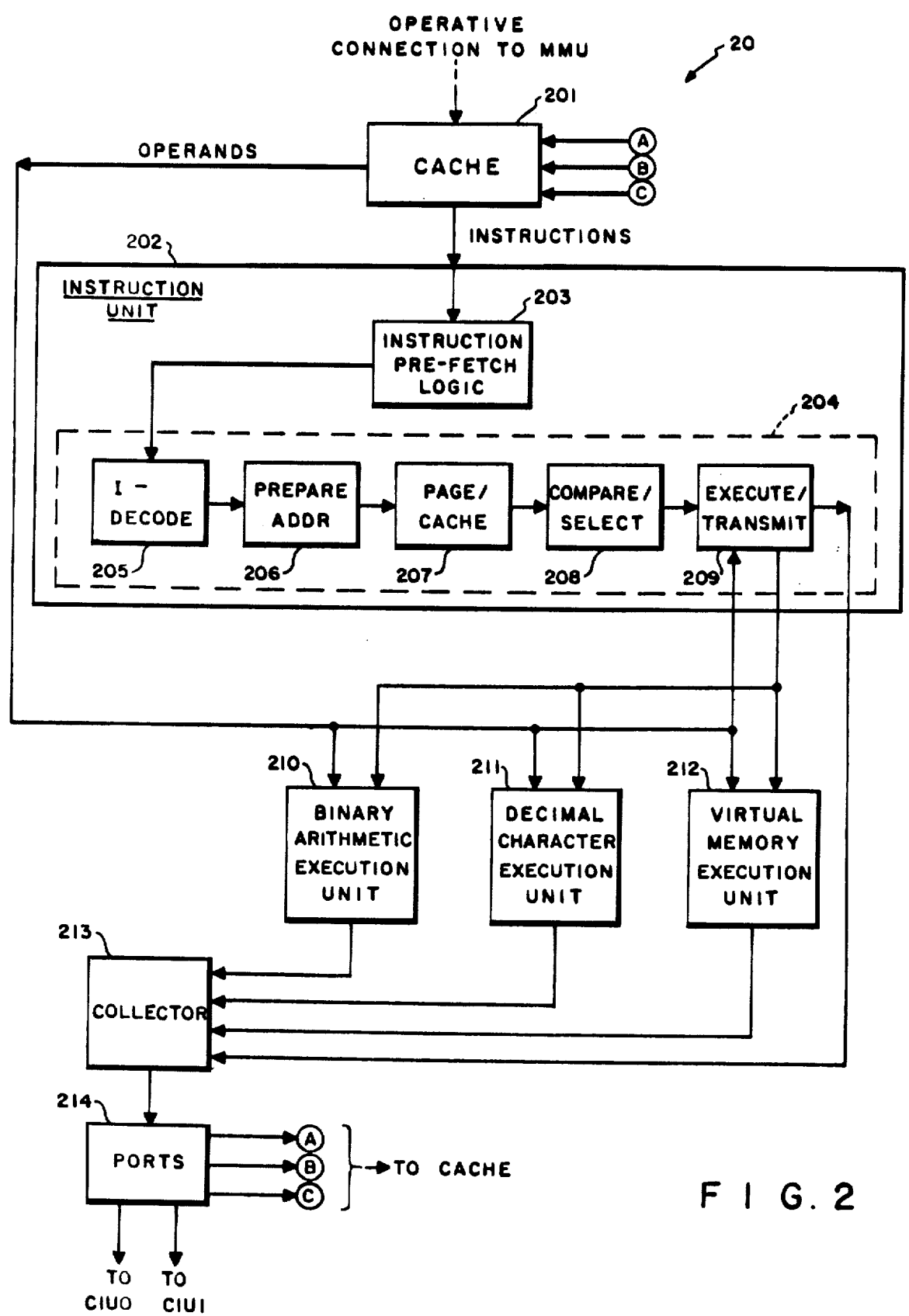
FIG. 2 shows a block diagram of the central processing unit in which a decimal character unit can be found.

Referring to FIG. 2, there is shown a block diagram of the preferred embodiment of the CPU 20 in which the present invention may be found. A cache memory (or more simply cache) 201 is provided for storing small blocks of words read from the main memory unit 21. The small blocks of words stored in cache 201 contain some instruction words and data words (or operand words) which will presently be executed and operated on by the execution units of CPU 20. An instruction unit 202 is included which comprises an instruction prefetch logic 203 and an instruction execution pipeline 204. The instruction prefetch logic 203 provides the instruction execution pipeline 204 with a supply of instructions to be executed. This is accomplished by including logic to predict the instruction sequence, prefetching instruction words from the cache memory 201, and storing them within the instruction prefetch logic block 203. The instruction execution pipeline 204 (also referred to herein as a central unit pipeline structure (CUPS)) performs the steps required for the execution of an instruction in individual stages. The first stage (I-DECODE) 205 receives the instruction to be executed from the instruction prefetch logic 203 and decodes the instruction. The second stage (Prepare Address) 206 prepares the virtual address. The third stage (Page/Cache) 207 performs a paging operation of the operand address and cache directory lookup. The fourth stage (Compare/Select) 208 initiates an operand access from cache 201 or from the main memory unit 21 in the case of a cache miss. The fifth stage (Execute/Transmit) 209 performs the actual execution of the instruction or dispatches information to an appropriate execution unit for execution.

In the preferred embodiment of the CPU, while all instructions must pass through all five stages of the central unit pipeline structure 204, not all instructions are fully executed in the fifth stage 209 of the pipeline. Some instructions are transmitted to other execution units outside the central unit pipeline structure 204, while the central unit pipeline structure 204 continues execution of succeeding instructions. The fifth stage 209 includes a basic operations execution unit (not shown) and central execution unit (not shown). The basic operations execution unit (not shown) performs the execution of those predetermined instructions which may be classified as basic operations. These are mostly very simple instructions requiring one or two cycles, including fixed point arithmetic (except multiply and divide), boolean operations, fixed point comparisons, register loads and shift operations. The central execution unit (not shown) executes a different set of predetermined instructions which refer to other instructions, move the contents of address registers or address related quantities between registers and storage, or alter processor stages.

Three additional instruction execution units are provided outside the central unit pipeline structure 204. A binary arithmetic execution unit 210 (BINAU) performs the execution of both binary and hexadecimal arithmetic operations and a fixed point multiply and divide. A decimal character execution unit (DECCU) 211 executes instructions involving decimal arithmetic, move and translate operations, character manipulations and binary string operations. The virtual memory execution unit (VMSM) 212 performs the execution of many privileged instructions including segment descriptor register manipulation, and handling fault and interrupt situations which manipulate the respective fault and interrupt registers. Each of the aforementioned execution units receives operands from the cache 201, and instructions (or commands) and descriptors from logic (not shown) of the fifth stage 209. Further, each execution unit usually operates independently of any activity occurring in the other execution units.

A collector execution unit, or more simply collector, 213 is the execution unit for most store instructions and is also the final execution unit involved in all other instructions. The collector 213 retrieves results from various results stacks of the other execution units, and updates cache 201 through a ports unit 214. The collector 213 also keeps a master copy of all program visible registers (not shown). The collector 213 permits the execution units to generate results independently and at different rates of speed, then updates the respective registers and cache in the original program sequence. The collector is more fully described in U.S. patent application Ser. No. 434,129 filed 13 Oct. 1982, entitled "Collector" by R. Guenthner, G. Edington, L. Trubisky, and J. Circello, assigned to the same assignee as the present application, the aforementioned application being incorporated by reference herein to the extent necessary for an understanding of the present invention. The ports unit 214 handles the CIU/CPU command interface processing, and the hierarchy control communication, i.e., the CIU/CPU memory hierarchy.

Although the preferred embodiment of the CPU 20 described above includes among its features paging, a 5-stage pipeline, instruction prefetch, virtual addressing, etc., it will be understood by those skilled in the art that the architecture of the DPS 10 or the CPU 20 described above is in no way intended to limit the decimal character execution unit 211 (or more simply decimal character unit) or to limit the present invention incorporated into the decimal character unit.

Referring to FIG. 3, there is shown a 36-bit computer word of the preferred embodiment having a nine-bit character format, a four-bit character format, and a six-bit character format. The nine-bit character format (FIG. 3A), also referred to as unpacked data, utilizes 9 bits to define a character, bits 0–8, 9–17, 18–26, and 27–35 defining characters 0, 1, 2 and 3, respectively. The four-bit character format (FIG. 3B), also referred to as packed data, utilizes four bits to define a character, bits 1–4, 5–8, 10–13, 14–17, 19–22, 23–26, 28–31, and 32–35, defining characters 0, 1, 2, 3, 4, 5, 6 and 7, respectively. Characters 0 and 1 of the four-bit character format are defined by dividing character 0 of the nine-bit character format in half. The remaining bit assigned to the high order bit (i.e., the left most bit as shown in the FIGURE), bit 0, is essentially a "dontt care" or "irregular" bit. Likewise, characters 2 and 3, 4 and 5, and 6 and 7, of the four-bit character format is defined by dividing characters 1, 2, and 3 of the nine-bit character format, respectively, in half. The high order bit, or dont't care bit, of the four-bit character format word, bits 0, 9, 18 and 27 can always be set to zero. The six-bit character format (FIG. 1C) utilizes 6 bits to define a character, bits 0–5, 6–11, 12–17, 18–23, 24–29, and 30–35 defining characters 0, 1, 2, 3, 4, and 5 respectively. Four additional bits in both the 9 and 4 bit character formats $P_0$, $P_1$, $P_2$, and $P_3$, can be carried along as the parity bits of respective characters. The "don't care" bit of the four-bit character bit is utilized, in the preferred embodiment, as a parity bit, and will be described in detail hereinunder.

FIG. 4A shows the computer instruction format of the preferred embodiment. The instruction word is the first word of the grouping and resides in the main memory unit 21 of the DPS 10 at a location Y. Up to three operand descriptor words, or simply descriptor words, reside in contiguous locations Y+1, Y+2, and Y+3, the number of descriptor words being determined by the particular instruction word. The instruction word contains the operation code, OP CODE, which defines the operation to be performed by the CPU. A second field $MF_1$ is the modification field which describes the address modification that is performed for descriptor 1. A third field, the Variable Field, contains additional information concerning the operation to be performed and will differ from instruction to instruction. When descriptors 2 and 3 are present, the Variable Field will contain information to describe the address modification to be performed on these operands. The descriptor words can be either the operand descriptor or an indirect word which points to the operand descriptor.

The operand descriptors which describe the data to be used in the operation, and provide the address for obtaining it from the main memory unit 21 are shown in FIGS. 4B, 4C, and 4D. A different operand descriptor format is required for each of the three data types, the three data types comprising the bit string, alpha-numeric, and numeric types. The field denoted Y defines the original data word address, C defines the original character position within a word of nine bit characters, B defines the original bit position within a 9 bit character, and N defines either the number of characters or bits in the data string or a 4-bit code which specifies a register that contains the number of characters or bits. CN defines the original character number within the data word referenced by the data word address. TA defines the code that defines which type alpha-numeric characters are in the data, i.e., 9 bit, 6 bit, or 4 bit. TN defines a code which defines which type numeric characters are specified, i.e., 9 bit or 4 bit. S defines the sign and decimal type, that is leading sign-floating point, leading sign-scaled, trailing sign-scaled, or no sign-scaled. SF defines the scale factor, the scale factor being treated as a power of 10 exponent where a positive number moves the scaled decimal point to the right and a negative number moves the scaled decimal point to the left. The decimal point is assumed to be immediately to the right of the least significant digit.

Referring to FIG. 5, there is shown the decimal character execution unit (DECCU) 211 in functional block diagram form where the apparatus of the present invention can be found. The DECCU 211 is the execution unit of the CPU 20 for a predetermined set of multiword instructions, including decimal arithmetic instructions, various character manipulation instructions, and instructions which operate on binary strings. The DECCU 211 is partitioned into two functional units, the character unit (DCU) 30 and the arithmetic unit (DAU) 40. The DCU 30 comprises two stages, a first stage 31, and a second stage 32. The DAU 40 comprises the third stage of the DECCU 211. The DECCU 211 receives operands from cache 201 and command information from instruction unit 202. The cache 201 and instruction unit 202 comprise the central unit 200 which is also operatively connected to main memory 21. Results from the DECCU 211 are transmitted to cache 201 (via the action of the collector 213 as discussed. The DCU 30 executes the character manipulation instructions including bit string instructions, and the DAU 40 executes the arithmetic instructions. The instructions executed by DECCU 211 are listed in Table 1. A complete description of each instruction is included in a Honeywell Software document entitled, "DPS 8 Assembly Instructions," copyright 1980 by Honeywell Information Systems Inc. (Order No. DH03-00), and can be referred to for more detailed information.

Figure 6:
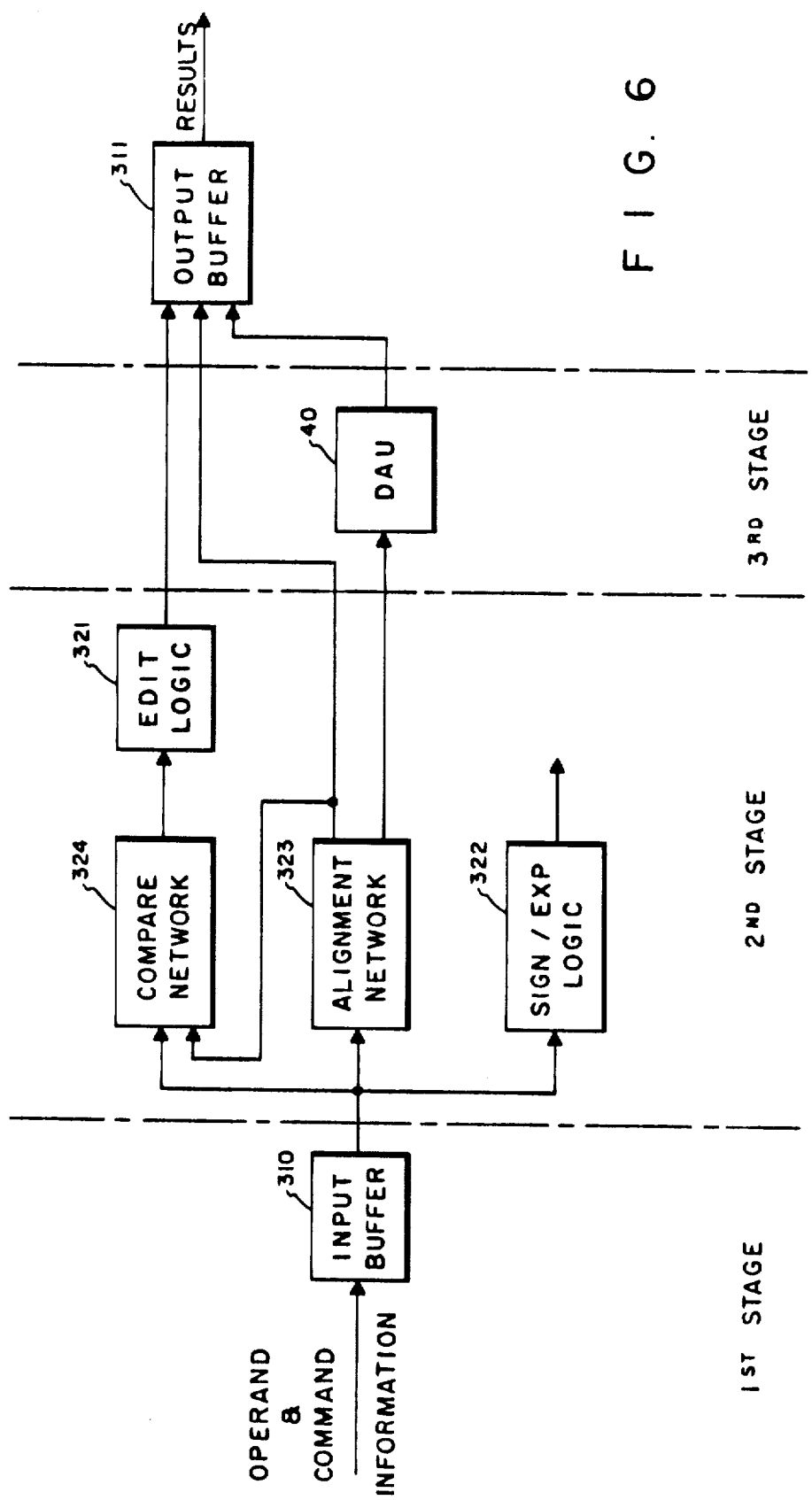
FIG. 6 shows a functional block diagram of the stages of the decimal character unit.

Referring to FIG. 6, a functional block diagram of the stages (or also referred to herein as levels) of the DECCU 211 is shown. The first stage 31 receives instruction and descriptor information from the instruction unit 202, and further receives the operand information from cache 201. The operands are stored in an input buffer 310 within the first stage 31, and the instructions are decoded and held in temporary registers and control flip flops of the first stage 31.

TABLE 1

ALPHANUMERIC
| | |
|---|---|
| MLR | Move Alphanumeric LEFT to Right |
| MRL | Move Alphanumeric RIGHT to Left |
| MVT | Move Alphanumeric with Translation |
| CMPC | Compare Alphanumeric Character String |
| SCD | Scan Character Double |
| SCDR | Scan Character Double in Reverse |
| TCT | Test Character and Translate |
| TCTR | Test Character and Translate in Reverse |
| SCM | Scan with Mask |
| SCMR | Scan with Mask in Reverse |

EIS NUMERIC
| | |
|---|---|
| MVN | Move Numeric |
| CMPN | Compare Numeric |
| AD3D | Add Using Three Decimal Operands |
| AD2D | Add Using Two Decimal Operands |
| SB3D | Subtract Using Three Decimal Operands |
| SB2D | Subtract Using Two Decimal Operands |
| MP3D | Multiply Using Three Decimal Operands |
| MP2D | Multiply Using Two Decimal Operands |
| DV3D | Divide Using Three Decimal Operands |
| DV2D | Divide Using Two Decimal Operands |

EIS BIT STRING
| | |
|---|---|
| CSL | Combine Bit Strings Left |
| CSR | Combine Bit Strings Right |
| SZTL | Set Zero and Truncation Indicator With Bit Strings Left |
| SZTR | Set Zero and Truncation Indicator With Bit Strings Right |
| CMPB | Compare Bit Strings |

EIS CONVERSION
| | |
|---|---|
| DTB | Decimal to Binary Convert |
| BTD | Binary to Decimal Convert |

EIS EDIT MOVE
| | |
|---|---|
| MVE | Move Alphanumeric Edited |
| MVNE | Move Numeric Edited |

NEW EIS MULTIWORD
| | |
|---|---|
| CMPCT | Compare Characters and Translate |
| MRF | Move to Register Format |
| MMF | Move to Memory Format |

TEN INSTRUCTIONS:
EBCDIC/OVERPUNCHED SIGN CAPABILITY
| | |
|---|---|
| MVNX | |
| CMPNX | |
| AD3DX | |
| AD2DX | |
| SB3DX | |
| SB2DX | |
| MP3DX | |
| MP2DX | |
| DV3DX | |
| DV2DX | |
| MVNEX | Move Numeric Edited Extended |

Second stage 32 contains edit logic 321, sign/exp logic 322, alignment network 323, and compare network 324 required to perform the character manipulation and alignment operations. The output of the second stage 32 is either the final result which is transmitted to an output buffer 311 to be stored in cache 201, or is aligned data passed to the DAU 40. The DAU 40, which comprises the third stage of the DECCU 211, performs the arithmetic operation on the aligned data (arithmetic operation may also be referred to herein as numeric execution). Each stage of the DECCU 211 will be described in detail hereinunder.

Figure 7:
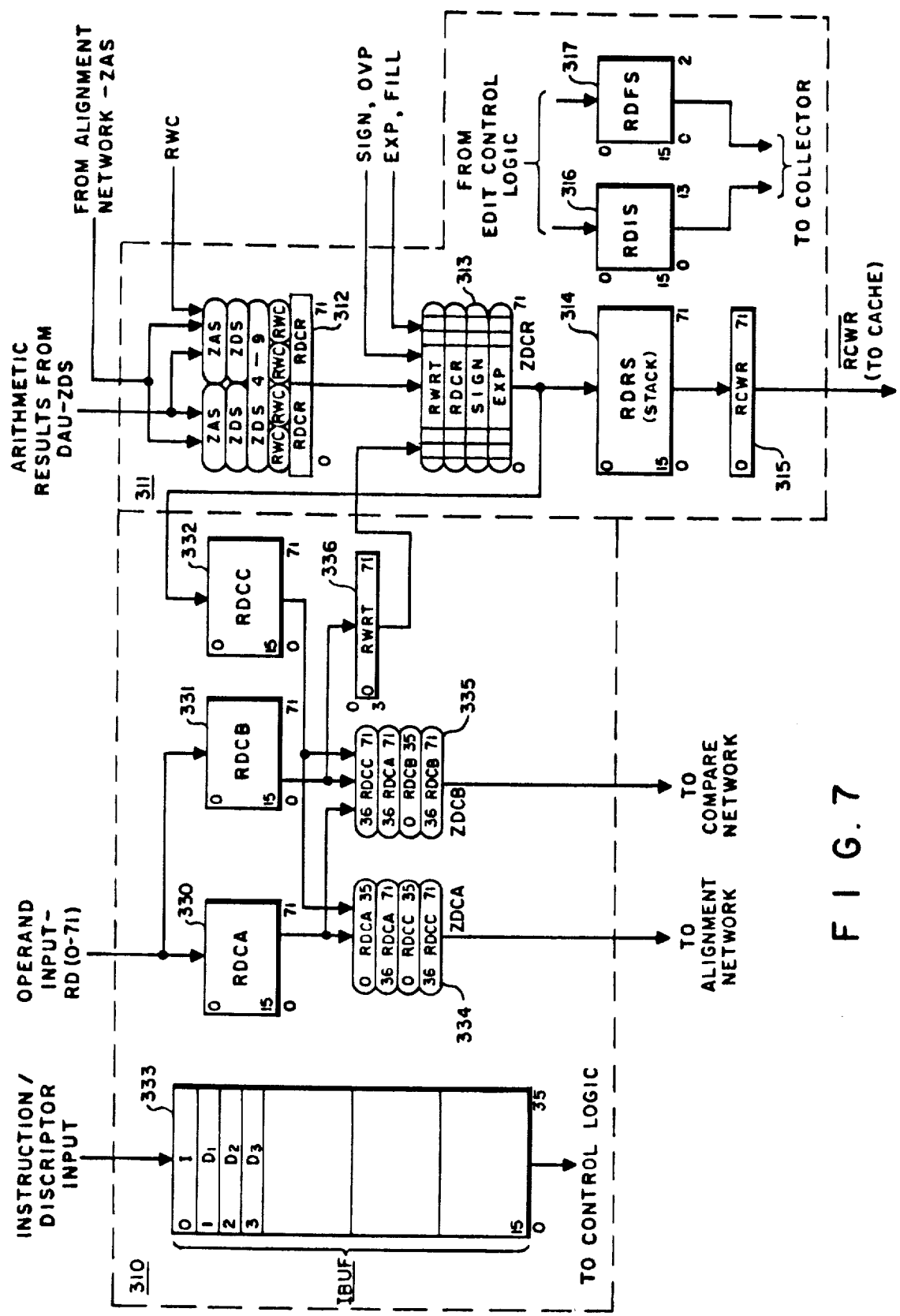
FIG. 7 shows a functional logic diagram of the input buffer and output buffer of the decimal character unit.

The input buffer 310 and output buffer 311 of the decimal character unit is shown in FIG. 7. The input buffer 310 comprises a first and second operand input stack, RDCA and RDCB 330 and 331, respectively (also referred to as stack A and stack B, respectively), and an instruction/descriptor input buffer 333, IBUF. A third stack RDCC 332 (also referred to as a wraparound buffer or stack C) forms the wraparound buffer for repetitive decimal numeric operations of the present invention and will be described in further detail hereinunder. A first and second switch 334 and 335 (also denoted as the ZDCA and ZDCB switches, respectively) is included as part of input buffer 310. First switch 334 is operatively connected to stack A 330 and stack C 332 for transferring selected data, ZDCA, to alignment network 323. Second switch 335 is operatively connected to stack A 330, stack B 331, and stack C 332 for transferring selected data ZDCB to compare network 324. A rewrite register 336, RWRT, is operatively connected to stack B 331, the output of RWRT being connected to output buffer 311. The loading of IBUF 333, and the operand input stacks 330, 331 is from CUPS 204 and cache 201, respectively under the control of CUPS 204.

The IBUF 333 is a 16 word by 36 bit buffer. Upon receipt of an instruction available signal from CUPS 204, an instruction/descriptor word is read into the corresponding location of IBUF 333. IBUF is organized in 4 four-word blocks, thereby capable of storing up to a maximum of four instructions at a time. The first word of the block is for storing the instruction word I, the second word of the block is for the first descriptor word D1, the third word of the block is for the second descriptor word D2 and the fourth word of the block is for the third descriptor word, if any. The information contained in the instruction/descriptor words is transferred to the various control logic for the generation of control signals to effect the execution of the functions required to execute the instruction. An IBUF-full control signal is sent to CUPS 204 when IBUF 333 is full. The format of the instruction/descriptor words and the significant control signals are described in the related patent application, paragraph (4) identified above and incorporated by reference herein.

Operand input data (also denoted by signal name RD) is loaded into stack A 330 and stack B 331 as a function of the instruction. In the preferred embodiment, stack A 330 and stack B 331 are each 16 word × 72-bit memory devices. Double word writes are made into the operand stacks 330, 331 and can hold operands awaiting execution for a maximum of 4 instructions. When the DECCU 211 receives a control signal from CUPS 204 indicating operands are available, the operands are fetched by doubleword reads. The input operands are loaded into stacks A and B 330, 331 according to steering control signals. An operand full control signal is transmitted to the CUPS 204 from the DECCU 211 when either operand stack is full. A stack full signal from stack A 330 and a stack full signal from stck B 331 is ORed to generate the operand full control signal to CUPS 204. Operand 1 data is loaded into stack A 330, and operand 2 data is loaded into stack B 331 for character type instructions. Operand 1 and operand 2 data are loaded into stack A 330 for numeric-type instructions (instructions sometimes being referred to as operations or OPS). Rewrite data and translated data are loaded into stack B 331. The loading of the operands into the operand stacks is selected according to the instructions as shown in Table 2.

TABLE 2

| DECCU Instruction | Stack A RDCA | Stack B RDCB |
| --- | --- | --- |
| MLR,MRL | OP1 | OP2 |
| MRF,MMF | OP1 | — |
| MVT | OP1 | OP2,OP3 |
| MVE,MVNE | OP1 | OP2,OP3 |
| TCT,TCTR | OP1 | OP2 |
| SCM,SCD | OP1 | OP2 |
| CMPC | OP1 | OP2 |
| CMPCT | OP1 | OP2,OP3 |
| CSL,CMPB,SZTL | OP1 | OP2 |
| DTB | OP1,OP2 | — |
| BTD | OP1 | OP2 |
| MVN | OP1,OP2 | OP2 |
| AD2D,MP2D | OP1,OP2 | OP2 |
| AD3D,MP3D | OP1,OP2 | OP3 |
| CMPN | OP1,OP2 | — |
| LPL,SPL | OP1 | — |

Operand data can be read from stack A 330 a double word at a time if it is to be packed 9-bit to 4-bit. This can occur with unpacked numeric operands and the MLR and MRL instructions. Otherwise the operand data is read on a single word basis. Operands from stack B 331 are single word reads. Rewrite data from stack B 333 is loaded into the RWRT (the rewrite register) 336 by a double word read. It can be seen that either a double word can be selected from stack A 330 or two single words from stack A 330 and B 331 by the ZDCA and ZDCB switches 334, 335, but not both.

DECCU numeric results are stored in stack C 332 as well as result stack RDRS 314 (the result stack will be described in detail hereinunder in conjunction with the output buffer 311) in case the result is to be one of the input operands for a numeric instruction immediately following. The normal operand fetches for that operand are cancelled, and that operand is read instead from stack C 332 thereby eliminating the delay introduced by waiting for the writing of the data into cache 201 followed by reading the data from cache 201, the delay referred to as a store-load break. The reading of operand data (also referred to as wraparound data) from stack C 332 (also referred to as the wraparound buffer) will be described in further detail hereinunder. Wraparound data from stack C 332 can be read on either a double word or single word basis just as if the operand were in stack A 330. The selected operand data, ZDCA and ZDCB, are sent to the alignment network 323 for alignment, to the compare network 324 for character comparison and selection, and to the sign/exp logic 322 to extract signs and exponents.

The control logic, which will be described in detail hereinunder, generates the read and write addresses for the stack A 330, stack B 331, and stack C 332. The control logic also generates the select controls for the ZDCA and ZDCB switches 334, 335. In addition, the control logic generates data available signals that allow the input registers of the alignment network 323 and the compare network 324 to be loaded. The control logic signals the CUPS 204 when ten or more locations in either stack A 330 or stack B 331 are used to prevent writing over good data.

The output buffer 311 comprises a 1-of-4 select double word register 312 (more simply referred to as the RDCR register), having inputs ZDS, arithmetic results from DAU 40, ZAS from alignment network 323, and resultant output from edit logic 321 (RWC register to be discussed hereinunder). An output buffer selected switch 313 (or more simply referred to as ZDCR switch) receives inputs from RDCR register 312, RWRT register 336, the sign, OVP data from sign/exp logic 322, and the EXP, FILL data from compare network 324. The data selected by the ZDCR switch 313 is stored in a results stack RDRS 314. The results stack RDRS 314 is a 16 word by 72 bit memory device or stack. The results stack 314 stores data to be stored in cache 201 via a RCWR register 315. The output buffer 311 also includes an indicator results stack 316 and a fault results stack 317. Indicator results stack 316 is a 14 bit × 15 high stack, and fault results stack 317 is a 3 bit × 15 high stack. Inputs are received from edit control logic and output results are transferred to the collector 213.

The format of the DECCU instruction/descriptor words is shown in FIG. 8. The words are generated by the CUPS 204 in the format shown. The instruction word includes the scale factor and sign information of the first operand. This format is important from timing considerations which will be described in detail hereinunder. SF, indicates scale factor for numeric operands. TYP identifies the data type as follows: 00 for 9-bit format, 01 for 6-bit data, and 10 for 4-bit data. SN indicates sign and decimal type for numerics. SEQ# indicates a sequence number and FILL is the fill character field. DCW indicates position within double word of first character, BP indicates position within first byte of first bit, and W indicates this operand is in stack C 332. Ln indicates the length of operand n, Zn is set if LN is zero, and Gn is set if Ln is greater than 256.

Referring to FIG. 9, there is shown a logic block diagram of the control logic for reading (and writing) operand data from stack A 330. The control logic can read operand data stored in stack A 330 in a forward or reverse direction, wherein the operand data can be multiple variable length data. The first operand input stack 330 (stack A) stores operand data, stack A being a 16 high × 72 bit stack. As mentioned above, the computer word of the preferred embodiment of CPU 20 is a 36-bit word. Therefore, each addressable location of the stack A 330 is a double word. The stack A 330 is divided into an even and odd half, each half storing single computer words, bits 0–35 define the even half of the stack and bits 36–71 define the odd half of the stack. Control logic 500, which controls the reading and writing of operand data into stack A 330, includes a write address register (RDCA-WA) 501 and a read address register (RDCA-RA) 502, both registers being operatively connected to stack A 330. Operand data from the central unit 200 is stored into sequential locations indicated by a write address value stored in the write address register RDCA-WA 501, the write address value denoted herein as the write address pointer (WA or WA pointer), and the write address value being incremented by one by an adder ADD 503. The first write address value of a set of data is also a starting address value for that data set, and is stored in a starting address register (RDCA-SA) 504. The starting address register 504 is a 4-high × 4-bit bank of registers. Since as many as four sets of operand data can be stored in stack A 330 (a data set being associated with an instruction), four starting address values (SA or SA pointer) can be stored in the starting address register 504 and four bits are required to address the 16 locations of stack A 330 (the numbers in the parenthesis of FIG. 10 indicate the bits, e.g., 0–3 references bits 0 through bits 3). The starting address register 504 is operatively connected to the read address register 502 through a start address switch 505.

The start address switch 505 operates to load the read address register 502 with either the start address value or the sum from ADDER2 403. The start address value stored in the starting address register 504 is concatenated with a WA-4 signal (one bit, bit 4 of WA, whereby a 0 value indicates the even half of stack A, and a 1 value indicates the odd half of stack A) and makes up the RDCA-SA:WA-4 signal. The sum from ADDER2 403 comprises the ADCA-RA signal. The WA-4 signal is the output of odd/even memory switch 510. The WA-4 signal (from odd/even select switch 510), which indicates the odd or even half of memory for single word reads, is generated by selecting the word bit from the IBUF 333 for the operand to be read, namely, bit 0 or $D_1$ for operand 1 and bit 0 of $D_2$ for operand 2. Since double word reads are performed on double word boundaries (i.e., from bits 0 to 71), the WA-4 signal from odd/even select switch 510 for double word reads is a logic '0'.

Included as part of control logic 500 is ADDER1 506 which adds the length of the operand (L−1) and the position within the double word of the first character (P). These quantities are received from CUPS 204 is discussed above in conjunction with FIG. 8. The output of adder 1 506 indicates the number of double words minus one which are to be loaded and defined as signal APR (0–4). The APR signal is loaded into a constant register (RDCA-K) 507 via an APR switch 508 and a constant switch 509. The output of APR switch 508 is a ZAPR signal which is either the APR signal or two times the APR signal, the APR signal being utilized for four-bit data format words (packed data) and two times the APR signal being used for the nine-bit data format words (unpacked data). ADDER1 506 and APR switch 508 are utilized for detecting a predetermined trailing character, described more fully in the application of related patent applications par (5).

ADDER2 403 generates the read address by adding the current read address stored in read address register 502 to a constant value stored in the constant register 507, the resulting sum being loaded in read address register 502 via start address switch 505. The constant switch 509 is utilized in part for controlling the selection of single word reads or double word reads of stack A 330 and for controlling the forward or reverse read of the operand data stored in stack A 330 as will be described in further detail hereinunder. Although not shown, it is understood that a duplicate set of control logic 500' exists for stack B 331 (the reference numerals with a prime denote the duplicate element for the stack B control logic).

Figure 10:
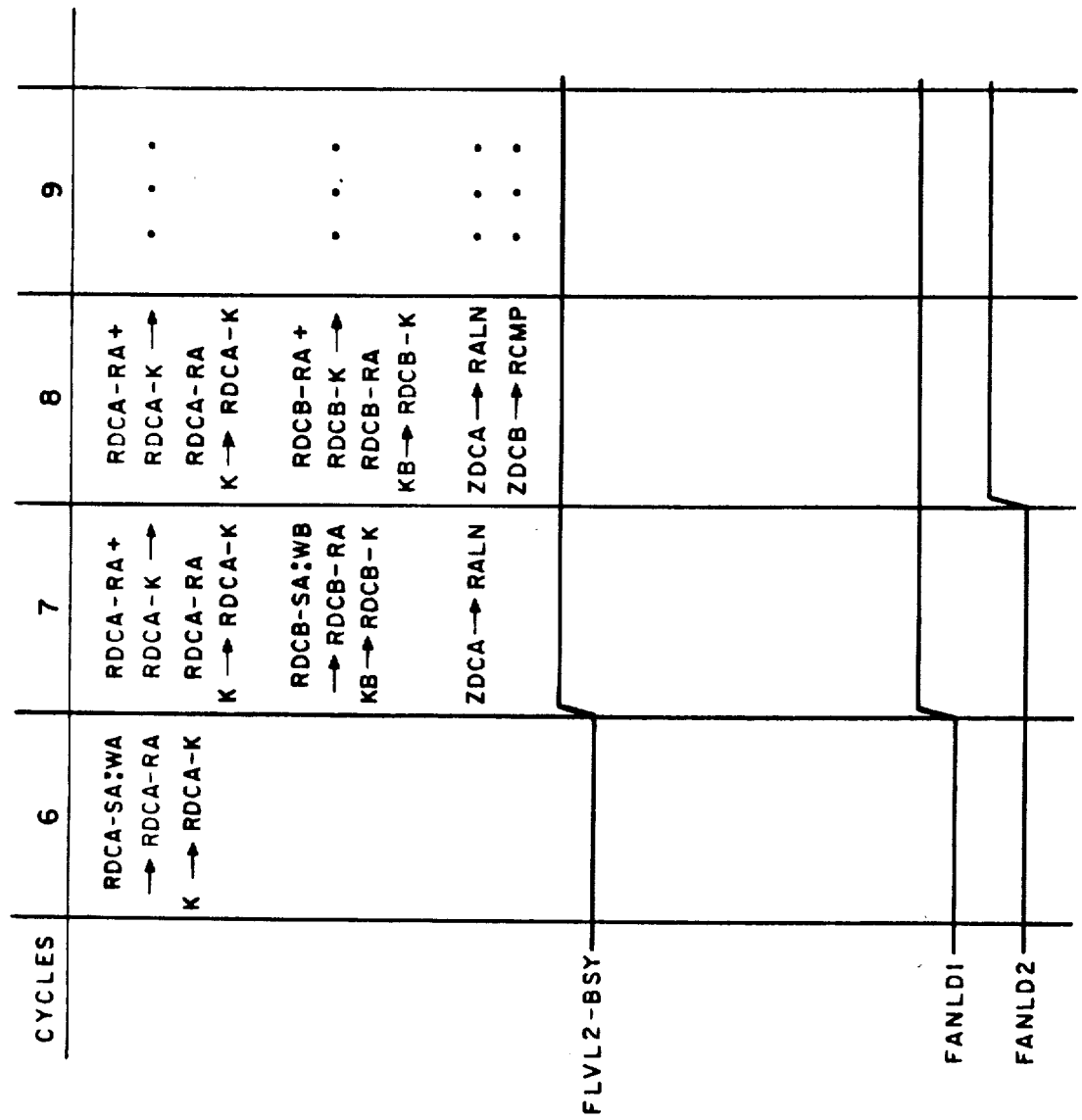
FIG. 10 shows a timing diagram of the steps performed in the overall operation of the control logic for the reading of the temporary storage memory.
Figure 11:
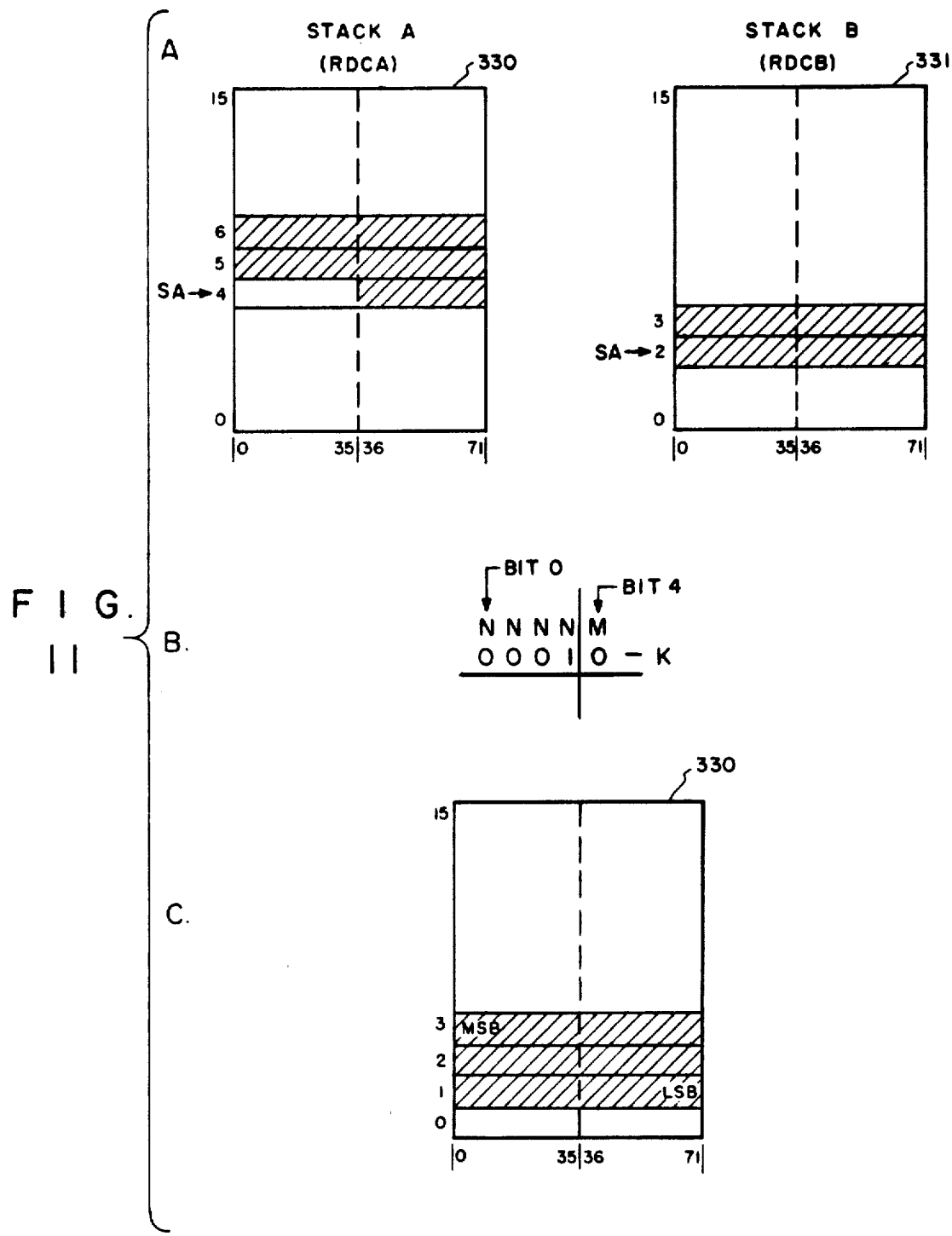
FIG. 11 shows stack A and stack B loaded with operand data.

The operation of the control logic 500 for reading operand data from the input stacks 330, 331, will now be described in conjunction with FIGS. 9, 10, and 11. FIG. 10 shows a timing diagram of the steps performed in the overall operation of the control logic 500 for the reading of stack A 330 in a forward or reverse direction. For purposes of example, assume that operand data is loaded into stack A 330 (RDCA) and stack B 331 (RDCB) starting at location 4 and location 2, respectively, as shown in FIG. 11A, a cross-hatched area denoting the words to be read. Further, for purposes of example here, the first word to be read from stack A 330 is in the odd half of location 4 of stack A 330, and the first word to be read from stack B 331 is in the even half of location 2. In the execution of the instruction shown here starting at cycle 6, such as a CMPC instruction, the operand data stored A 330 will be read. The starting address of the data in stack A 330 will have a binary value of 4 (0100) in this example. Thus, the starting address register (RDCA-SA) 504 will contain the starting address value of 4. The starting address value contained in starting address register RDCA-SA 504 will be selected by start address switch 505 along with the WA-4 signal which indicates the odd or even half of memory, in this example the WA-4 signal will have a value of 1 indicating the odd half of memory. The start address switch 505 initially selects switch position 0 and subsequently selects switch position 1. Therefore, the read address register 502 will contain the RDCA-SA:-WA-4 value, that is, the start address value concatenated with the WA-4 signal (a resultant binary value of 01001). Constant switch 509 selects position 0 such that constant register 507 will contain a binary value of 00001. Switch position 0 of constant switch 509 is for forward signal word reads, switch position 1 (a constant value of 2) is for forward double word reads, and switch position 2 whereby XXX varies between logic one and logic zero, i.e., a value of −1 and +3 is for reverse reads. Position 0 of constant switch 509 is selected here since single word reads from the stack are to be performed, i.e., a single word of 36 bits is to be read.

During cycle 7, the stack A 330 location is read as specified by the read address register 502, in this example the odd half of location 4 will be read and directed to the alignment register 341. Also, the control signal FANLD1 is set to enable the loading of the operand into the RALN register 341. Also, during cycle 7, the reading of stack B 331 is initiated. The starting address value of stack B, in this example a value of 2, which has been stored in the starting address register for stack B (RDCB-SA) 504' is loaded into the read address register for stack B (RDCB-RA) 502'. [Note here that the 'B' designation and prime nomenclature indicates the equivalent elements of the duplicated control logic 500' for the control for stack B.] Also, the constant KB is loaded into the constant register for stack B (RDCB-K) 507'. Also during cycle 7, the value initially stored in the read address register 502 (01001 binary) is added to the value stored in the constant register (00001 binary) by ADDER2 403, and stored in the read address register 502 through the start address switch 505, the start address switch on subsequent cycles selecting position 1 (i.e., the ADCA-RA signal).

During cycle 8 the value now stored in read address register 502 (01010 binary), the value specifying the even half of location 5 of memory, is now read and transmitted to the alignment register 341. The value stored in the read address register 502 (01010 binary) is added to the value stored in the constant register 507 (00001 binary) and transmitted to the read address register 502. The constant register 507 is loaded with constant K (position 0, having a value of 00001 binary).

Also during cycle 8, the value stored in read address register RDCB-RA 502' (having a value of 00100 binary) specifies the location to be read from stack B 331, namely the even half of memory of location 2. The word read from stack B 331 is transmitted to the RCMP register 380 of the compare network 324. The control signal FANLD2 is raised to enable the loading of the data read from stack B into the RCMP register 380. The value stored in the read address register RDCB-RA 502' (00100 binary) and the value stored in constant register RDCB-K 507' (a value of 00001 binary) is added by ADDER2 403' resulting in a sum having a value of 00101 binary, this value specifying the odd half of location 2 of memory, and is directed to the read address register RDCB-RA 502'. Cycle 9 repeats the steps of cycle 8, reading the next sequential word from the stack from the respective stacks, until cycle 11 when all the data has been read.

From the above example, it can be seen that adding a constant of +1 to the old read address value achieves the forward single word read operation. Since the address of stack A 330 is defined by the upper four bits N of FIG. 11B (i.e., bits 0—3 of the read address value in read address register 502), and bit 4 (M of FIG. 12B) indicates the odd or even half of the stack A 330, it can be seen that a constant of +2 adds a one to the address value each cycle, resulting in a sequential double word read. The M bit (WA-4 signal from the odd/even memory select switch 510) is a logic 0 for double word reads, as discussed above.

For a reverse single word read, the operand data is loaded in stack A 330 as shown in FIG. 11C by the central unit 200. For reverse reads, it is desired to read the data out LSB first. In this case, the initial value loaded into the read address register is 00011 binary indicating the odd half of location 1 of stack A 330 (this is the value of the RDCA-SA:WA-4 signal). On the next cycle the constant of −1 is added to the value contained in the read address register 502. This is achieved by selecting switch position 2 of constant switch 509 in which the values of X are caused by control logic (not shown) to have a logic 1 value. This results in an output signal ADCA-RA from ADDER2 403 to have a 00010 binary value which is the even half of location 1 of stack A 330. This is the location read out on this cycle. On the subsequent cycle, a constant of +3 is added to the value of the read address register 502, the value in the read address register now being 00010 binary. The constant of +3 is formed by the control logic causing X to have a logic 0 value which when added to the contents of the read address register 502 results in a sum (ADCA-RA signal) of 00101 which is the odd half of location 2. Thus it can be seen that a reverse single word read occurs by causing the constant values selected to vary between −1 and +3 on alternate cycles.

Cycles 1 through 5 are utilized by the central unit 200 to fetch and decode the instruction as explained in detail in related application, noted in paragraph (4) above. The control signal FLVL2-BSY indicates the second stage of the DECCU 211 is busy. It was assumed in the above example that the stack A 330 and stack B had been loaded sometime prior to cycle 6.

Figure 12:
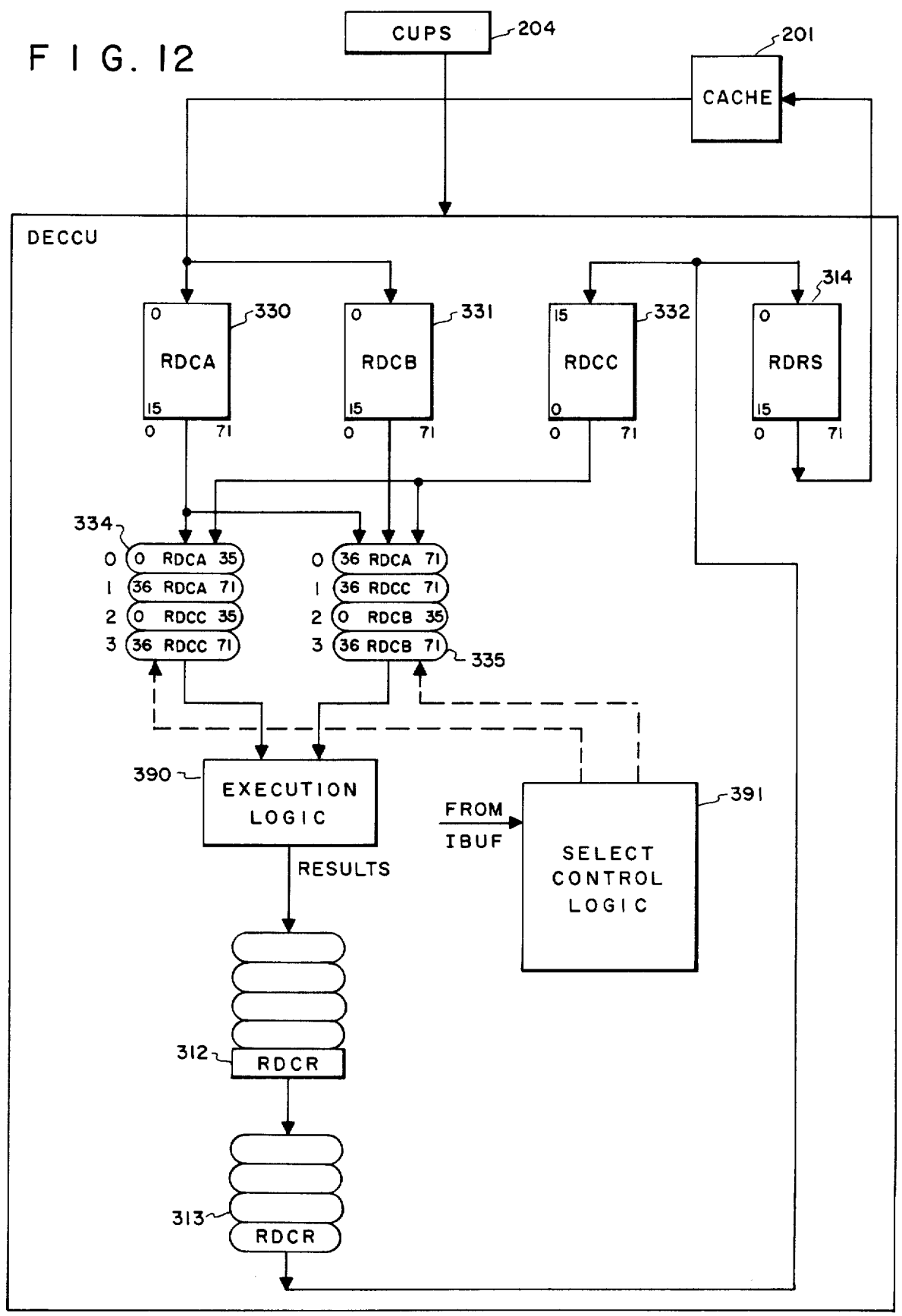
FIG. 12 shows a functional block diagram of the data processing system specifically showing the data flow through the data processing system.

The operand data selection from the input stacks, stack A 330 (RDCA) and stack B 331 (RDCB), incorporating stack C (RDCC) 332 (i.e., the wraparound buffer) of the present invention will now be described. Referring to FIG. 12, there is shown a functional block diagram of the data processing system (DPS) 10 specifically showing the data flow through the DPS 10. Operand data is loaded into stack A 330 and stack B 331 from cache 201 under control of CUPS 204. The first switch 334 is operatively connected to stack A 330 and the second switch 335 is operatively connected to stack B 331, and is also operatively connected to stack A 330. Stack A 330 and stack B 331 are each operatively connected to execution logic 390, as discussed above, the execution logic 390 comprising edit logic 321, sign/exp logic 322, alignment network 323, compare network 324, and DAU 40. The output of the execution logic 390 (RESULTS) is transferred to the results stack RDRS 314 and wraparound buffer 332 via RDCR register 312 and the output buffer select switch 313. The data stored in the result stack 314 is subsequently stored in cache 201 under control of the collector 213, as discussed above. The output of wraparound buffer 332 is further operatively connected to first switch 334 and second switch 335. Hence, the results stored in wraparound buffer 332 can also be used as an input operand by the next instruction. (Note that the result is a completed or final result of the extended instruction and not a temporary or partial result that would occur during the execution of the instruction.) In cases where the operand can be obtained from the wraparound buffer 332 rather than from the cache 201, a speedup is realized since the fetch from cache 201 is eliminated. The conditions which allow an operand to be obtained from the wraparound buffer 332 rather than from the cache 201 are detected by the CUPS 204, and are as follows:

A. The immediately preceding instruction must have been one of the following:
AD2D(X)
SB2D(X)
MP2D(X)
DV2D(X)
AD3D(X)
SB3D(X)
MP3D(X)
DV3D(X)
MVN(X)
BTD B. The current instruction must be one that requires a numeric input operand. Instructions in this category are:
AD2D(X)
SB2D(X)
MP2D(X)
DV2D(X)
AD3D(X)
SB3D(X)
MP3D(X)
DV3D(X)
MVN(X)
CMPN(X)
MVNE(X)
DTB C. The result descriptor for the immediately preceding instruction must compare exactly with the input descriptor for the current instruction.

D. The MF fields (discussed above in conjunction with FIG. 4) associated with these descriptors must also compare exactly.

When these conditions are detected, the CUPS 204 sets the "W" bit in the descriptor sent to the DECCU 211 indicating that the input operand is to be fetched from the wraparound buffer 332. (The W bit of the descriptor was discussed above in conjunction with FIG. 8.) Still referring to FIG. 12, select control logic 391 receives inputs from IBUF 333, including the W bit and provides the control to first and second switches 334, 335 for selecting the input operand, the select control logic to be discussed in further detail hereinunder.

Figure 13:
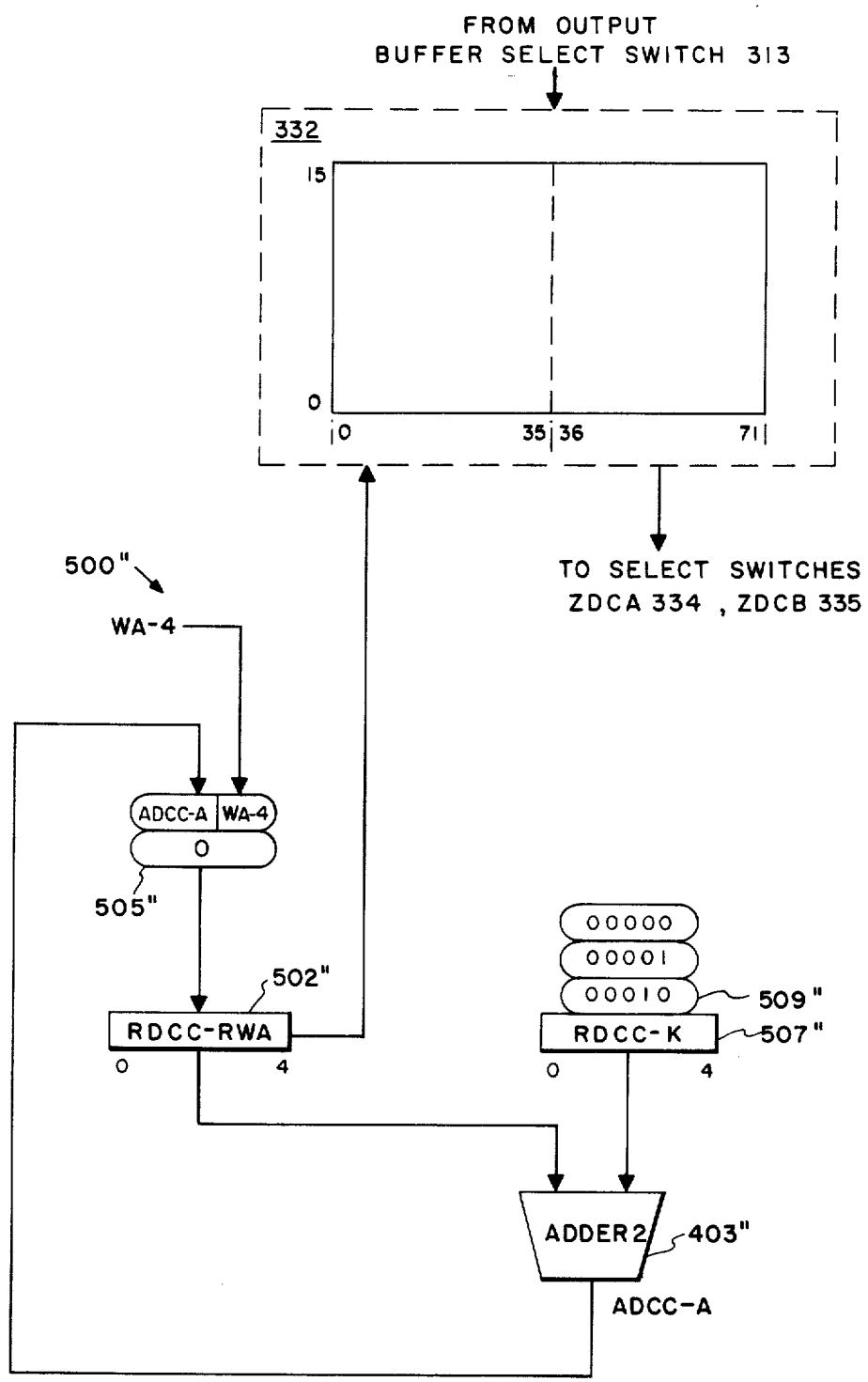
FIG. 13 shows the control logic for reading and writing operand data from the wraparound buffer.

Referring to FIG. 13, there is shown the control logic 500" for reading (and writing) operand data from wraparound buffer 332. The wraparound buffer 332 of the preferred embodiment of the present invention is a 16-high×72-bit stack. Data is input from the output buffer select switch 313 by double word writes (i.e., 72 bits) and can be packed or unpacked data. A single register, read/write register 502", is provided for addressing the wraparound buffer 332 for read and write operations. When data is to be loaded into wraparound buffer 332, a start address switch 505", operatively connected to the read/write register 502", initially loads the read/write register 502" with zero value. Hence, data is always loaded into wraparound buffer 332 starting at location 0. ADDER2 403", operatively connected to the read/write register 502" and also operatively connected to a constant register 507", decrements the current address contained in read/write register 502" by the value of the constant provided by constant register 507". Hence, the next address loaded in wraparound buffer 332 will be location 15. A WA-4 signal for indicating odd/even half of wraparound buffer 332, and a constant switch 509" for providing the constant to constant register 507" corresponding to packed or unpacked data, are provided in control logic 500".

Figure 14:
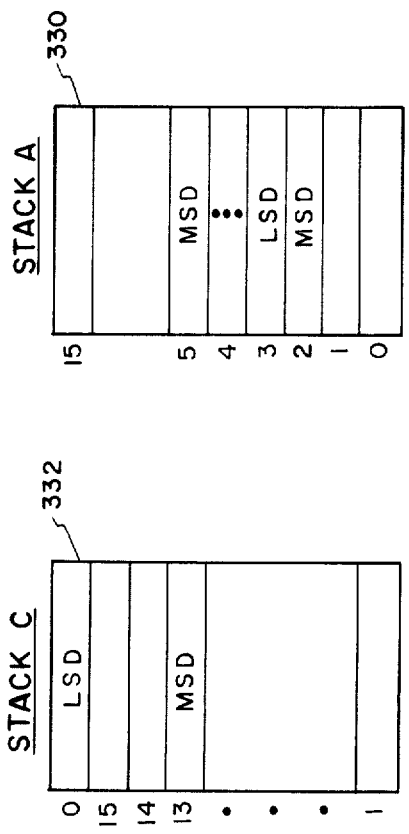
FIG. 14 shows the data layout within wraparound buffer after a write operation.

From the above discussion, it can be seen that data is therefore loaded into wraparound buffer 332 as shown in FIG. 14. Referring to FIG. 14, the wraparound buffer 332 is shown after the write operation is completed, and is redrawn showing the wraparound condition, i.e., location 0 is the first location loaded, location 15 is the next contiguous location loaded, etc., since ADDER2 403" decrements the current address by the constant from constant register 507". The first location loaded, location 0, will contain the least significant digit (LSD), since the results are generated LSD first.

For a read operation, if the W1 bit is set (i.e., the W bit of descriptor 1), operand 1 data is to be obtained from the wraparound buffer 332. Since, for operand 1 data, it is desired to read the most significant digit (MSD) first, read/write register 502" will contain the address of the last value loaded, i.e., the address of the MSD. Each read cycle for operand 1 data, ADDER2 403" is incremented by the constant, thereby reading operand 1 data in the desired order. Still referring to FIG. 14, stack A 330 contains only operand 2 data as shown. In this example, operand 2 will be read from stack A 330 starting at location 2 to obtain the MSD, i.e., to obtain the sign as described more fully in the related application of Para. (8). Subsequent operand 2 data is then read in order starting from location 3, 4 . . . etc., the data having previously been preloaded by CUPS 204 into stack A 330 in order that the data may then be read least significant digit first to most significant digit. This order is desired such that arithmetic operations may start without requiring the execution to be held up until all the data has been read.

Still referring to FIG. 14, and also referring to FIG. 12, the read sequence of the above example is in accordance with Table 1. The first step reads the MSD of operand 1 (OP 1) data, the operation of the control logic 500" being as discussed above. The select control logic 391 causes first select switch 334 to select position 2 on the first read cycle and then position 3 on the second read cycle for packed data. For unpacked data select control logic 391 causes first select switch 334 to select position 2 and causes second select switch 335 to select position 1. The second step reads operand 2 (OP 2) data from stack A 330, the select control logic 391 selecting the positions of the select switches as indicated in Table 1. Step 3 reads OP 1 data from wraparound buffer 332, step 3 being repeated as many times as is necessary to read all of the OP 1 data. Step 4 reads OP 2 data and is repeated as often as is required to read all of the OP 2 data from stack A 330.

Figure 15:
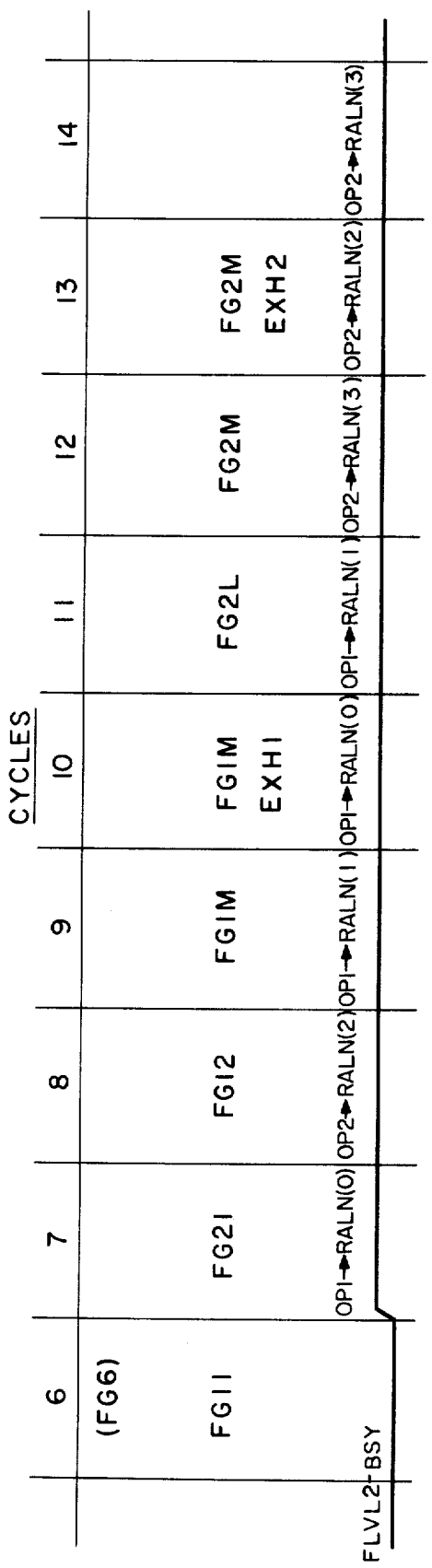
FIG. 15 shows a timing diagram of a read operation of the input stacks.
Figure 16:
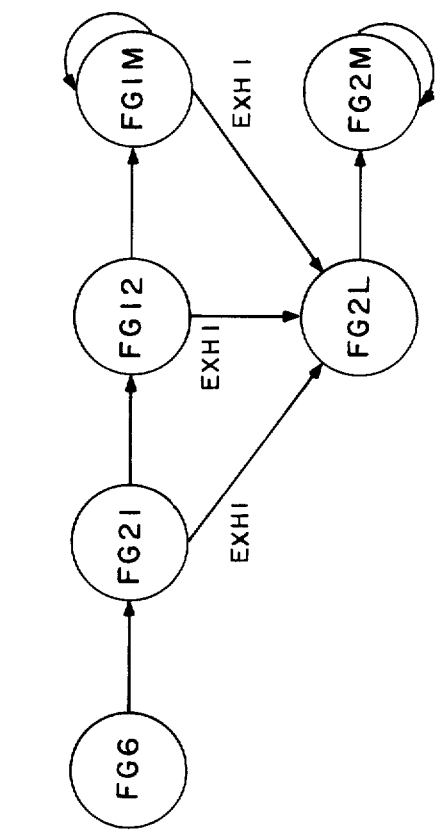
FIG. 16 shows a state diagram corresponding to the timing diagram of FIG. 15.

Referring to FIG. 15, there is shown a timing diagram of the read operation discussed above. Starting at cycle 6, control logic 500" for reading operand 1 data from wraparound buffer 332 is set up such that at the start of cycle 7 the actual read is performed. A state flip-flop (not shown) forming part of select control logic 391 indicates a state FG6 (also denoted as FG11). $FG_{XY}$ denotes the states of the logic where X=1 or 2 signifying operand 1 or operand 2 data respectively, and where Y=1, M, or L, signifying first word, more words, or last words. In this example, operand 1 data is read until operand 1 data is exhausted (EXH1), cycle 10 is this example, and then operand 2 data is read until operand 2 data is exhausted (EXH2). The data read from the input stacks is transferred to the alignment registers (not shown) as discussed more fully in the related application of Para. (8). FIG. 16 shows a state diagram corresponding to the timing diagram of FIG. 15. Table 2 shows the constant selected by the control switch 509 of the control logic 500. Constant switch 509" selects a constant of +2 for unpacked data and a constant of +1 for packed data. WRAP1 signifies a wrap 1 condition in which the W bit of descriptor 1 is set, i.e., operand 1 data is to be fetched from the wraparound buffer 332. WRAP2 indicates a wrap 2 condition, that is operand 2 data is to be obtained from the wraparound buffer 332.

TABLE 1

| STEP | READ DATA | FROM | FOR | SELECT 1st switch 334 position | 2nd switch 335 position |
|---|---|---|---|---|---|
| 1 | OP1 | RDCC | Packed | 2,3 | — |
|   |     |      | Unpacked | 2 | 1 |
| 2 | OP2 | RDCA | Packed | 0,1 | — |
|   |     |      | Unpacked | 0 | 0 |
| 3 | OP1 | RDCC | Packed | 2,3 | — |
|   |     |      | Unpacked | 2 | 1 |
| 4 | OP2 | RDCA | Packed | 0,1 | — |
|   |     |      | Unpacked | 0 | 0 |

TABLE 2

| STATE | CONSTANT SELECTED UNPACKED DATA | PACKED DATA | CONDITION | |
|---|---|---|---|---|
| FG6 | 2 | 2 | no WRAP | |
|     | 0 | 0 | WRAP1 | |
|     | 2 | 1 | WRAP2 | |
| FG21 | 2 | −1 | WA−4=0 | |
|      | 2 | 2 | WA−4=1 | |
|      | 2 | 2 | WRAP1 | not |
| FG12 | 2 | 3 | WA−4=0 | EXH1 |
|      | 2 | 1 | WA−4=1 | |
|      | 2 | 1 | WRAP2 | |
| FG1M | 2 | 1 | | |
| FG21 | 2 | 2 | | |
| FG12 | 2 | 3 | WA−4=0 | EXH1 |
|      | 2 | 2 | WA−4=1 | |
| FG1M | 2 | 2 | | |
| FG2L | 2 | 3 | WA−4=0 | |
|      | 2 | −1 | WA−4=1 | |
| FG2M | 2 | 3 | WA−4=0 | |

TABLE 2-continued

| STATE | CONSTANT SELECTED | | CONDITION |
|---|---|---|---|
| | UNPACKED DATA | PACKED DATA | |
| | 2 | −1 | WA−4=1 |

Referring to FIG. 17, there is shown a logic circuit diagram of the select control logic 391 for causing the first select switch 334 and the second select switch 335 to select the operand data from the proper input stack. The input stack is selected in accordance with the Boolean equations as follows:

$$cSEL - RDCB = NUMERIC \cdot MLR\ 9 - 4$$

$$cSEL - RDCC = \overline{(FG21 + FG2L + FG2M)} \cdot FWRAP1 +$$

$$(FG21 + FG2L + FG2M) \cdot FWRAP2$$

(FWRAP1 is a F/F set by the W1 bit.) The logic equations above indicate that if OP2 data is not being read (i.e., OP1 data is being read) and a WRAP1 condition exists, then the OP1 data is to be read from RDCC (wraparound buffer 332), or if OP2 data is to be read and a WRAP2 condition exists, then the OP2 data is to be read from RDCC. RDCB is selected if the data to be read is not numeric and the data is packed data. Still referring to FIG. 17 the control signals cZDCA−0 and cZDCA−1 are utilized to control the first select switch 334. Likewise, signal cZDCB−0 and cZDCB−1 are utilized to control the second select switch 335. The logic of FIG. 17 essentially implements the select switch positions indicated in Table 1, and other combinations of OP1, OP2 data and packed and unpacked data. RDCB-RA(4) is bit 4 of the read address register 502', RDCA-RA(4) is bit 4 of the read address register 502 of control logic 500 shown in FIG. 9 and RDCC-RWA(4) is the contents of read/write register 502" of control logic 500" of FIG. 13. Bit 4 of these signals indicates the odd or even half of memory which is utilized in making the selection of the first or second select switch. Flip flops 392 and 393 are set by the respective select signals defined above by the logic equations.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a data processing system, having a main storage element for storing programs and data utilized by a central processing unit (CPU) of said data processing system, said CPU executing the programs stored in the main storage element, said CPU being operatively connected to said main storage element, and wherein the CPU includes a central unit, a cache unit, and a plurality of execution units, the cache unit storing instructions and operands currently awaiting execution, the cache unit being operatively connected to the main storage element, and the central unit performing predetermined initial operations on the instructions, the initial operations including fetching instructions from said cache unit, decoding the instructions, preparing the virtual address, paging and fetching the operand associated with the instruction, and transferring the instruction to a predetermined one of the execution units, each execution unit performing the execution of a predetermined class of instruction, each execution unit being operatively connected to said cache unit for receiving operands and to said central unit for receiving predetermined instructions processed by said central unit, wherein at least one execution unit includes a first stage, operatively connected to said central unit and to said cache unit, for temporarily storing input data, said input data being predetermined instructions including operation commands from said central unit and the operand being received from said cache unit, and a second stage, having two inputs for receiving two operands, operatively connected to said first stage for executing the predetermined instruction, and wherein the first stage includes a first input buffer for temporarily storing at least one predetermined instruction, and a second input buffer for temporarily storing the operand associated with said temporarily stored predetermined instruction to distribute said temporarily stored operand to the second stage, said second input buffer comprising:
(a) first storage means, operatively connected to said cache unit, for temporarily holding said operand;
(b) second storage means, operatively connected to an output of said second stage, for temporarily holding result data from the completed execution of the instruction by said second stage;
(c) control logic means, operatively connected to said first input buffer, for generating select control signals; and
(d) switch means, operatively connected to said first storage means and to said second storage means, and further operatively connected to said second stage, for selectively coupling the operand stored in said first storage means or the result data stored in said second storage means to said second stage to be utilized in the execution of the next sequential instruction from the completed instruction which yielded the result data, in response to said select control signals.

2. In a data processing system, having a main storage element for storing programs and data utilized by a central processing unit (CPU) of said data processing system, said CPU executing the programs stored in the main storage element, said CPU being operatively connected to said main storage element, and wherein the CPU includes a central unit, a cache unit, and a plurality of execution units, the cache unit storing instructions and operands currently awaiting execution, the cache unit being operatively connected to the main storage element, and the central unit performing predetermined initial operations on the instructions, the initial operations including fetching instructions from said cache unit, decoding the instructions, preparing the virtual address, paging and fetching the operand associated with the instruction, and transferring the instruction to a predetermined one of the execution units, each execution unit performing the execution of a predetermined class of instruction, each execution unit being operatively connected to said cache unit for receiving operands and to said central unit for receiving predetermined instructions processed by said central unit, wherein at least one execution unit includes a first stage, operatively connected to said central unit and to said cache unit, for temporarily storing input data, said input data being predetermined instructions including operation commands from said central unit and the operand being received from said cache unit, and a second stage, having two inputs for receiving two operands, operatively connected to said first stage for executing the predetermined instruction, and wherein the first stage includes a first input buffer for temporarily storing at least one predetermined instruction, and a second input buffer for temporarily storing the operand associated with said temporarily stored predetermined instruction to distribute said temporarily stored operand to the second stage, said second input buffer comprising:

(a) first storage means, operatively connected to said cache unit, for temporarily holding a first operand;

(b) second storage means, operatively connected to said cache unit, for temporarily holding a second operand;

(c) third storage means, operatively connected to an output of said second stage, for temporarily holding result data from the completed execution of the instruction by said second stage;

(d) control logic means, operatively connected to said first input buffer, for generating select control signals; and (e) switch means, operatively connected to said first, second and third storage means, and further operatively connected to said second stage, for selectively coupling the operand stored in said first storage means or said second storage means, or the result data stored in said third storage means, to said second stage to be utilized in the execution of the next sequential instruction from the completed instruction which yielded the result data, in response to said select control signals.

* * * * *